(12) United States Patent
Hasegawa (10) Patent No.: US 8,164,650 B2
(45) Date of Patent: Apr. 24, 2012

(54) IMAGE PROCESSING APPARATUS AND METHOD THEREOF

(75) Inventor: Naoyuki Hasegawa, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 398 days.

(21) Appl. No.: 12/511,587

(22) Filed: Jul. 29, 2009

(65) Prior Publication Data

US 2010/0053381 A1 Mar. 4, 2010

(30) Foreign Application Priority Data

Sep. 1, 2008 (JP) ................. 2008-223920

(51) Int. Cl.
- *H04N 9/73* (2006.01)
- *G03F 3/08* (2006.01)
- *G06K 9/00* (2006.01)
- *G06K 9/40* (2006.01)

(52) U.S. Cl. ............. 348/223.1; 348/655; 358/518; 382/167; 382/274

(58) Field of Classification Search .......... 348/223.1, 348/224.1, 225.1, 655, 231.3, 231.6; 358/518; 382/167, 274

See application file for complete search history.

(56) References Cited

U.S. PATENT DOCUMENTS

| | | | |
|---|---|---|---|
| 6,608,925 B1* | 8/2003 | Edge et al. ............ | 382/162 |
| 6,816,611 B1 | 11/2004 | Hagiwara et al. ..... | 382/165 |
| 7,120,295 B2* | 10/2006 | Edge et al. ............ | 382/162 |
| 7,619,773 B2* | 11/2009 | Haikin et al. ......... | 358/1.9 |
| 7,876,970 B2* | 1/2011 | Goma et al. .......... | 382/254 |
| 8,013,903 B2* | 9/2011 | Ohga ................... | 348/222.1 |
| 2003/0035159 A1* | 2/2003 | Nakami ................ | 358/532 |
| 2004/0246506 A1* | 12/2004 | Hoshuyama et al. .. | 358/1.1 |
| 2005/0168596 A1* | 8/2005 | Ito et al. ............... | 348/222.1 |
| 2005/0265625 A1* | 12/2005 | Li et al. ................ | 382/274 |
| 2006/0192861 A1* | 8/2006 | Ohga ................... | 348/222.1 |
| 2006/0274342 A1* | 12/2006 | Haikin et al. ......... | 358/1.9 |
| 2006/0290954 A1* | 12/2006 | Stokes et al. ......... | 358/1.9 |
| 2007/0165945 A1* | 7/2007 | Goma et al. .......... | 382/167 |
| 2009/0067708 A1* | 3/2009 | Maier ................... | 382/162 |
| 2010/0026837 A1* | 2/2010 | Koishi .................. | 348/225.1 |
| 2010/0053360 A1* | 3/2010 | Hasegawa ............. | 348/222.1 |
| 2010/0054589 A1* | 3/2010 | Ishii ..................... | 382/167 |
| 2010/0165137 A1* | 7/2010 | Koishi .................. | 348/222.1 |

FOREIGN PATENT DOCUMENTS

JP 2000-48184 2/2000

(Continued)

OTHER PUBLICATIONS

Henry A Rowley et al., "Neural Network-Based Face Detection," *IEEE Transactions on Pattern Analysis and Machine Intelligence*, vol. 20, No. 1 (1998) pp. 1-28.

(Continued)

*Primary Examiner* — John Villecco (74) *Attorney, Agent, or Firm* — Fitzpatrick, Cella, Harper & Scinto (57) ABSTRACT

A white point of a shooting condition corresponding to image data is acquired, and information of a local white point corresponding to a pixel of interest of the image data is calculated using surrounding pixels of the pixel of interest. An adapting white point corresponding to the pixel of interest is calculated based on the white point of the shooting condition and the information of the local white point. Image data of the pixel of interest is corrected using the adapting white point.

8 Claims, 11 Drawing Sheets

FOREIGN PATENT DOCUMENTS

| | | |
|---|---|---|
| JP | 2006-313465 | 11/2006 |
| WO | WO 2008050761 A1 * | 5/2008 |

OTHER PUBLICATIONS

Ming-Hsuan Yang et al., "Detecting Faces in Images: A Survey," *IEEE Transactions on Pattern Analysis and Machine Intelligence*, vol. 24, No. 1 (2002) pp. 34-58.

CIE Technical Report "A Color Appearance Model for Color Management Systems: CIECAMO2" CIE159: 2004.

Hiroshi Yamaguchi et al., "A Study of Simultaneous Lightness Perception for Stimuli with Multiple Illumination Levels" *Twelfth Color Imaging Conference*, pp. 22-29, 2004.

Jingtao Kuang et al., "iCAM06: A refined image appearance model for HDR image rendering," *Journal of Visual Communication*, (2007) pp. 406-414.

* cited by examiner

| image1.img | |
|---|---|
| PHOTOGRAPHING INFORMATION | |
| IMAGE WIDTH W | 100pixel |
| IMAGE HEIGHT H | 50pixel |
| OPTICAL SENSOR WIDTH dw | 36mm |
| OPTICAL SENSOR HEIGHT dh | 24mm |
| LENS FOCAL LENGTH f | 25mm |
| ENLARGEMENT RATIO m | 25% |
| EXPOSURE TIME T | 1/100sec |
| APERTURE VALUE F | F11 |
| ISO SPEED | 100 |
| WHITE POINT (XYZ) OF LIGHT SOURCE | 950.05, 1000.0, 1088.8 |
| IMAGE DATA (RGB) | |
| PIXEL 1 | 10, 0, 39 |
| PIXEL 2 | 12, 45, 11 |
| ... | |
| PIXEL 5000 | 121, 31, 228 |

IMAGE PROCESSING APPARATUS AND METHOD THEREOF

BACKGROUND OF THE INVENTION

1. Field of the Invention

The present invention relates to image processing based on a human vision model.

2. Description of the Related Art

Nowadays, the household penetration rate of digital cameras in the country exceeds 50% (2004 Consumer Behavior Survey (Cabinet Office)), and "photographing by a digital camera" is a very common activity.

Upon photographing a certain scene by a digital camera outdoors, the luminance range of a photographing target (scene) is often broader than a photographable luminance range. In this case, tone information of an object outside the photographable luminance range cannot be recorded, thus causing a so-called highlight-detail loss and shadow-detail loss. For example, when a person is photographed outdoors on a fine day while the exposure value is adjusted to that person, a highlight-detail loss occurs in an image region including sky and clouds of the background, and a shadow-detail loss occurs in an image region including the shade of trees. On the other hand, the human vision has a characteristic called "local adaptation" that switches the state of adaptation according to the lightness level of a viewing region, and allows to perceive lightness levels and colors, and one can perceive tones in both bright and dark places. For this reason, an impression upon directly viewing a photographing scene is often different from that upon viewing a photographed image of that scene.

As one of techniques that can solve such problem, a high-dynamic-range imaging (HDR) technique is known. The HDR technique roughly includes an HDR capture technique and HDR reproduction technique.

The HDR capture technique is used to expand a photographing dynamic range so as to prevent any highlight-detail loss and shadow-detail loss, and a method of compositing images photographed using a plurality of exposure values is known. An image acquired by this HDR capture technique will be referred to as an HDR image hereinafter.

The HDR reproduction technique is used to well reproduce an HDR image with a broad dynamic range by a display device or output device (to be referred to as an image output device hereinafter) with a narrow dynamic range and, for example, a method of compressing low-frequency components of an HDR image is known. In this manner, the HDR technique can eliminate a highlight-detail loss and shadow-detail loss by the capture technique used to expand the dynamic range and the corresponding reproduction technique.

In recent years, image correction using a human vision model is applied to the HDR reproduction technique. The human vision model is obtained by modeling the visual characteristics such as a color adaptation characteristic and luminance adaptation characteristic of a human, and can express how one views an actual scene using numerical values based on the state of adaptation of the vision.

Figure 1:
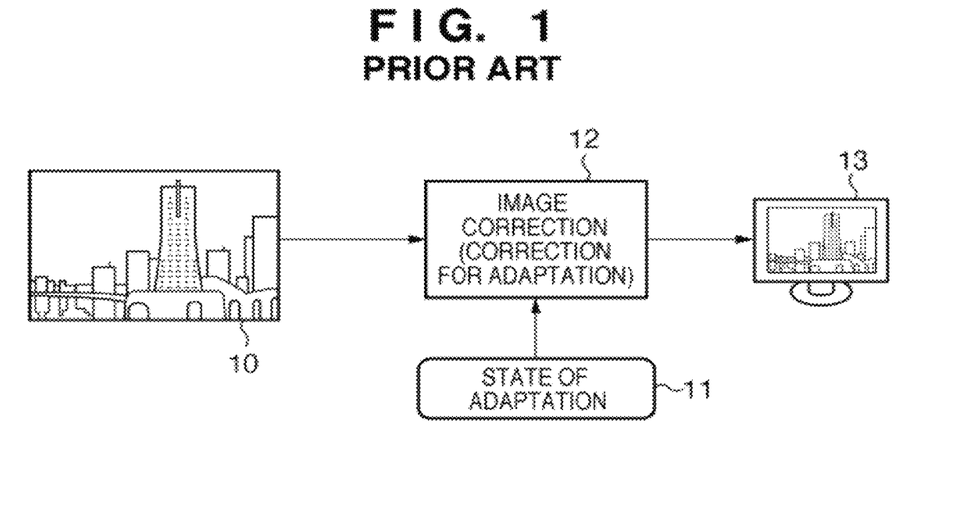
FIG. 1 is a view for explaining an overview of image correction using a human vision model in an HDR reproduction technique.

FIG. 1 is a view for explaining an overview of image correction using the human vision model in the HDR reproduction technique.

An HDR image 10 before correction is input, and data (a state of adaptation 11) indicating the lightness levels and colors of an actual scene perceived by a person are calculated based on the human vision model. Then, image correction (correction for adaptation) 12 is applied to reproduce the state of adaptation 11 by an output device 13 as best as possible. In this manner, the colors and tones of an actual scene are faithfully reproduced.

As the human vision model used in the HDR reproduction technique, a human vision model, which switches the state of adaptation according to the lightness levels and colors of a viewing object and considers the local adaptation characteristic (to be referred to as a local adaptation model hereinafter), as typified by the iCAM (Kuang, J., Johnson, G. M., Fairchild M. D. "iCAM06: a refined image appearance model for HDR image rendering" Journal of Visual Communication, 2007), has been proposed. The local adaptation model calculates a state of adaptation according to a viewing region by applying low-pass filter processing to an image before correction. That is, the local adaptation model calculates states of local adaptation by applying the low-pass filter processing to an image.

However, it is pointed out that the low-pass filter processing excessively reflects the locality of adaptation (Yamaguchi, H., Fairchild M. D. "A Study of Simultaneous Lightness Perception for Stimuli with Multiple Illumination Levels" $12^{th}$ CIC, 22-29). That is, the low-pass filter processing does not always precisely simulate how one views an actual scene, and preferred reproduction may sometimes not be obtained. In other words, a novel method which calculates the states of local adaptation of the vision more accurately at the time of photographing an image is required.

SUMMARY OF THE INVENTION

In one aspect, an image processing method comprising the steps of: acquiring a white point of a shooting condition corresponding to image data; calculating information of a local white point corresponding to a pixel of interest of the image data using surrounding pixels of the pixel of interest; calculating an adapting white point corresponding to the pixel of interest based on the white point of the shooting condition and the information of the local white point; and correcting image data of the pixel of interest using the adapting white point.

According to the aspect, image data can be corrected by accurately computing the state of adaptation of the vision.

Further features of the present invention will become apparent from the following description of exemplary embodiments with reference to the attached drawings.

DESCRIPTION OF THE EMBODIMENTS

Image processing according to an embodiment of the present invention will be described in detail hereinafter with reference to the drawings.

First Embodiment

[Apparatus Arrangement]

Figure 2:
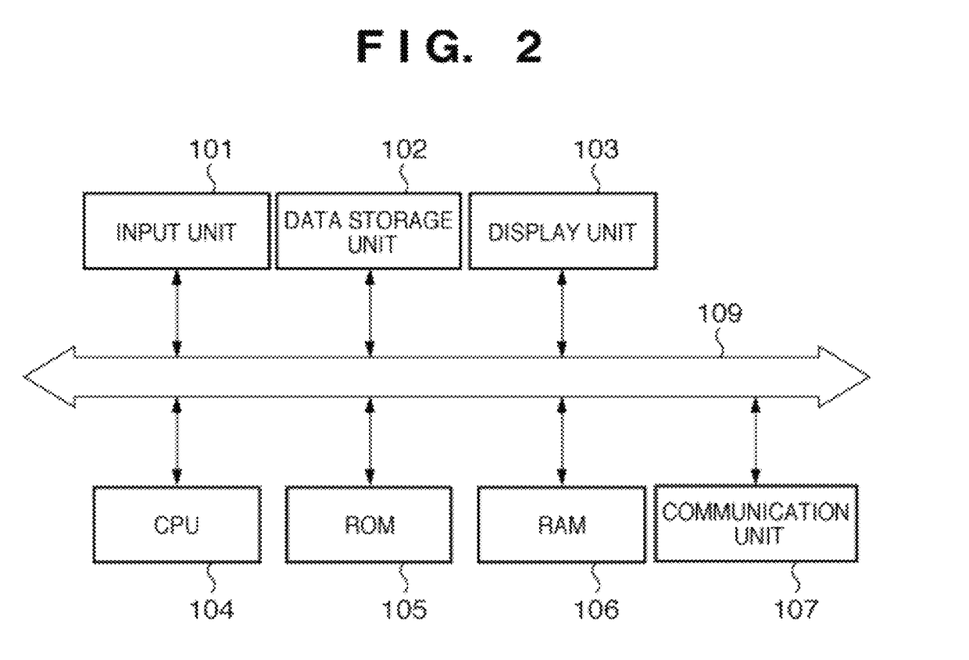
FIG. 2 is a block diagram showing the arrangement of an image processing apparatus according to an embodiment.

FIG. 2 is a block diagram showing the arrangement of an image processing apparatus according to an embodiment.

A microprocessor (CPU) 104 executes various programs stored in a read-only memory (ROM) 105 and data storage unit 102 using a random access memory (RAM) 106 as a work memory, and controls units to be described below via a system bus 109. Also, the CPU 104 executes image processing to be described later. The ROM 105 and data storage unit 102 store various data required for control and image processing.

The CPU 104 inputs user instructions and data via an input unit 101. That is, the input unit 101 includes a keyboard, pointing device, and USB (Universal Serial Bus) interface used to input data. Note that the pointing device includes a mouse, track ball, track pad, and tablet. Or when this embodiment is applied to a device such as a digital camera or printer, the input unit 101 may include a touch panel, numeric key pad, buttons, and mode dial. Also, the input unit 101 may include a so-called software keyboard which implements a keyboard by software.

The CPU 104 writes data such as image data in the data storage unit 102 and reads out data from the data storage unit 102. That is, the data storage unit 102 includes a hard disk drive, memory card, and optical disk drive. The data storage unit 102 can store the aforementioned programs, data, and the like in addition to the image data. Of course, some areas of the RAM 106 may be used as the data storage unit 102.

The CPU 104 displays a user interface (UI), image processing statuses, images before and after image processing, and the like on a display unit 103. That is, the display unit 103 is a display device such as a liquid crystal display (LCD). The display unit 103 is not limited to a device built in the image processing apparatus, but it may be an external display connected to the image processing apparatus via a cable.

The CPU 104 communicates with external devices via a communication unit 107. That is, the communication unit 107 includes a network interface card (NIC) or a serial bus interface such as USB and IEEE1394. Of course, as the communication unit 107, a wireless interface such as IrDA, IEEE802.11a/b/g/h, Bluetooth, or UWB (Ultra Wide Band) may be used. The CPU 104 can acquire programs and data such as image data from a server apparatus on a network via the communication unit 107.

[Image Processing]

Figure 3:
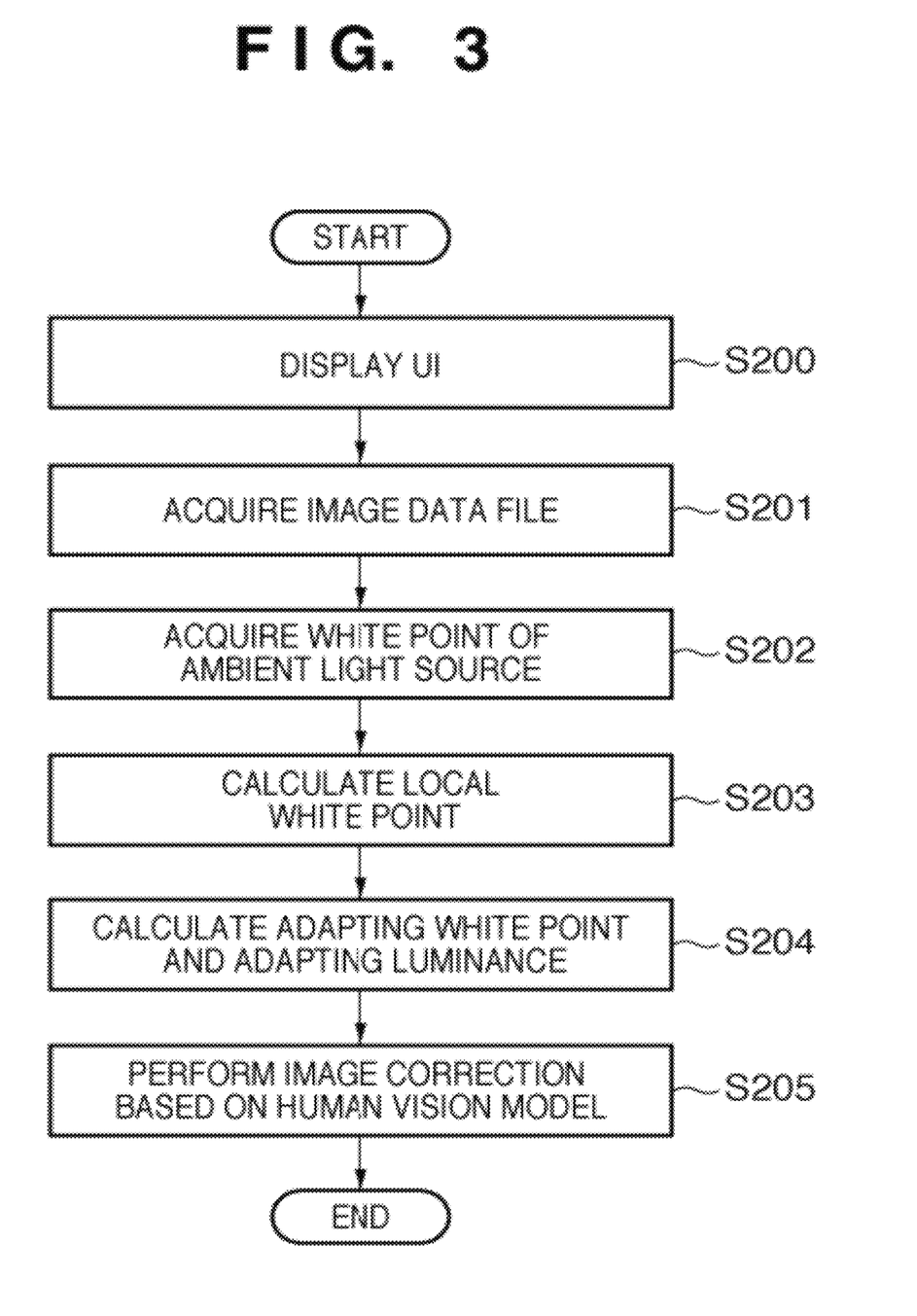
FIG. 3 is a flowchart for explaining image processing.
Figure 4:
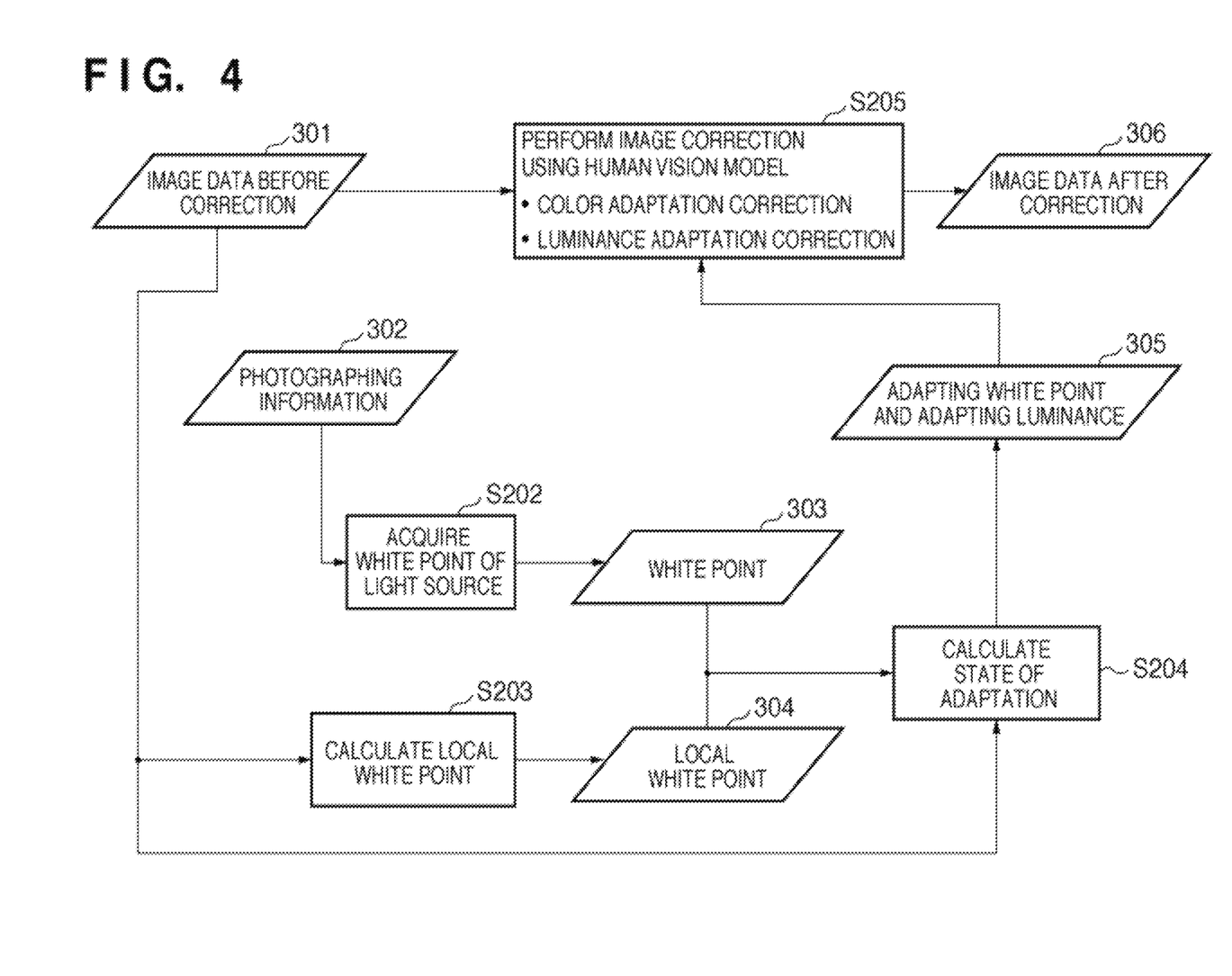
FIG. 4 is a chart showing the relationship between the image processing and data.
Figure 5:
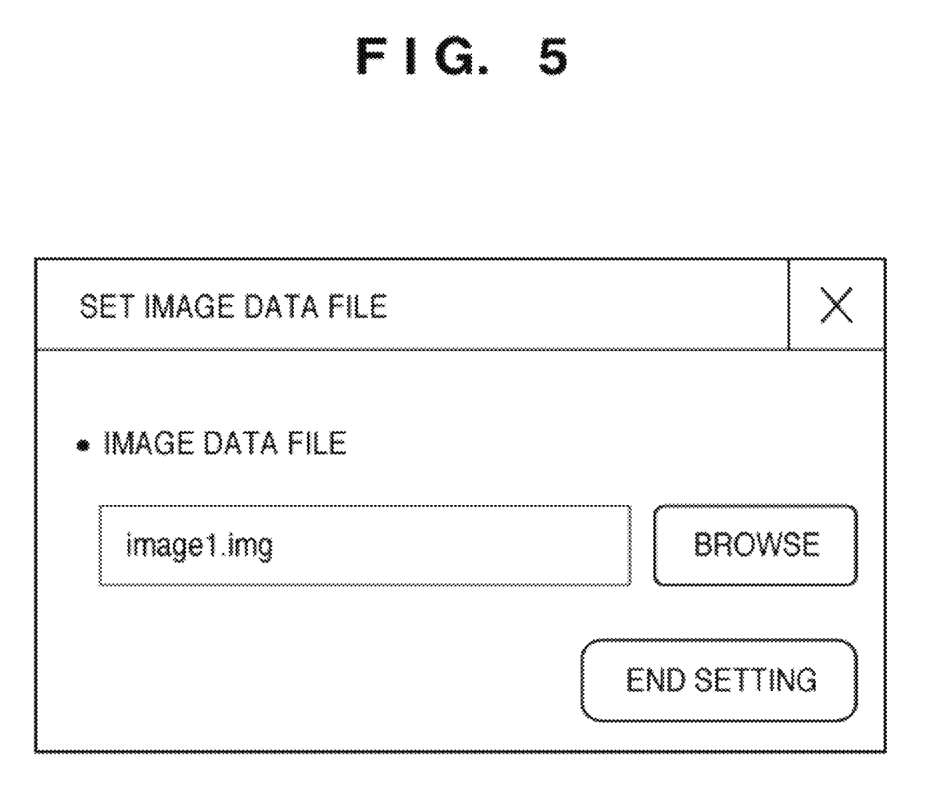
FIG. 5 is a view showing an example of a user interface (UI).

FIG. 3 is a flowchart for explaining image processing, FIG. 4 is a chart showing the relationship between the image processing and data, and FIG. 5 is a view showing an example of a user interface (UI). A correction example of image data photographed by a digital camera will be described below.

The CPU 104 displays a UI shown in FIG. 5 on the display unit 103 so as to acquire a user instruction of an image data file to be read from, for example, the data storage unit 102 (S200). When a user instruction is input via the input unit 101, the CPU 104 acquires a designated image data file from, for example, the data storage unit 102 (S201). The image data file includes image data 301 before correction, and photographing information 302.

Figure 6:
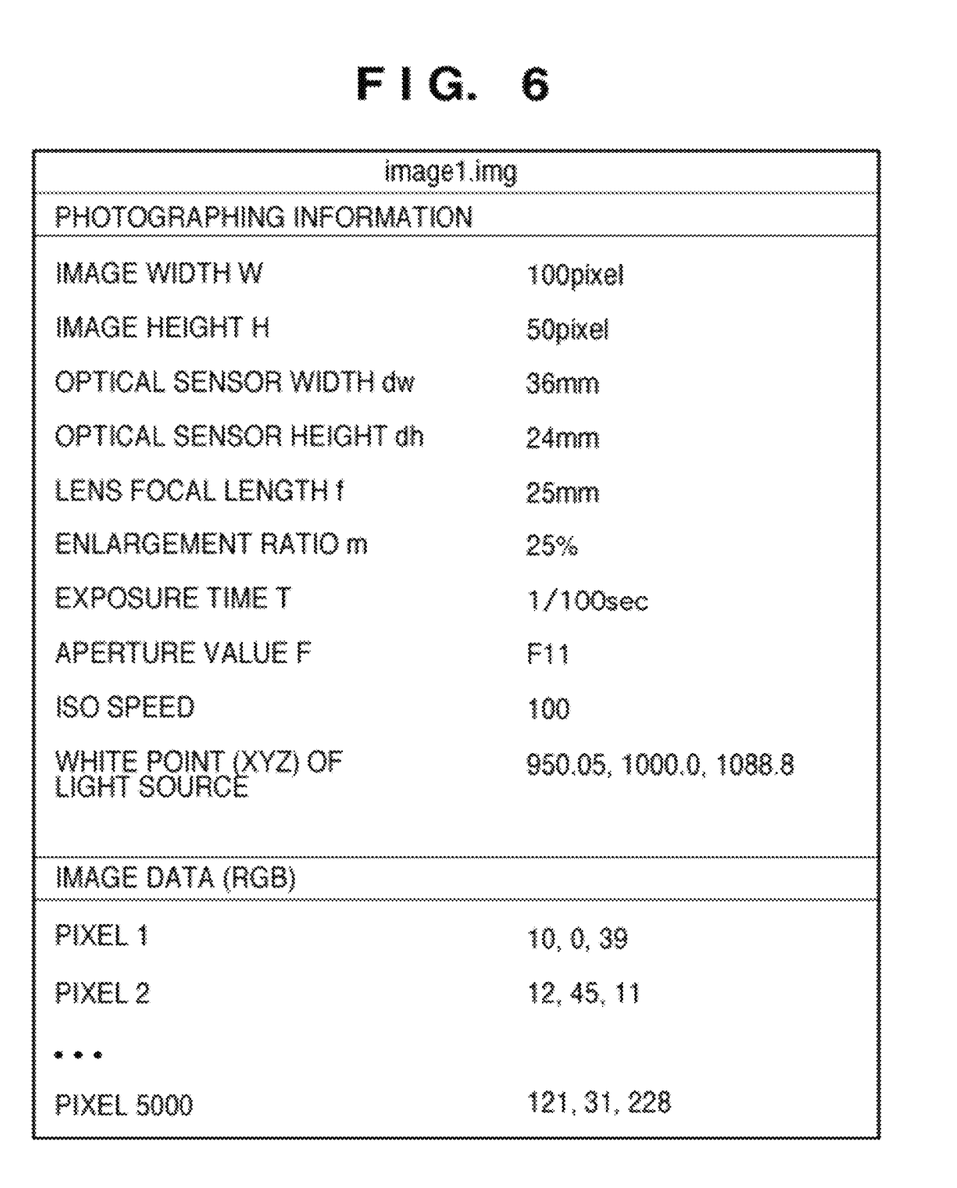
FIG. 6 is a view showing an example of the format of an image data file.

FIG. 6 is a view showing an example of the format of an image data file.

At the head of the image data file, tags of an image width, image height, optical sensor width, optical sensor height, lens focal length, enlargement ratio (zoom ratio), exposure time, aperture value, ISO speed, and white point of a light source at the time of photographing are included as the photographing information 302, and corresponding values are recorded. Note that as the white point of the light source, XYZ tristimulus values measured using, for example, a luminance meter are recorded. Note that as the white point of the light source, a color temperature as an estimated value or designated value of white balance (white balance information) may be recorded.

After the photographing information 302, the image data file records pixel data such as 8-bit RGB values in a raster-scan order as the image data 301 before correction. Note that an image data part may be compressed using a JPEG format or lossless compression format.

The CPU 104 then acquires a white point 303 of a light source (a white point of a shooting condition) from the photographing information 302 included in the acquired image data file (S202). This white point of the light source is common to the entire image. Then, as will be described in detail later, the CPU 104 converts the image data 301 before correction into XYZ values based on the photographing information 302, and applies low-pass filter processing based on a local adapting visual field size calculated from the photographing information 302 to the XYZ values, thus calculating XYZ values indicating local white points 304 (S203). The local white points 304 are calculated for respective pixels, and may be different for respective pixels. Note that the white point 303 and local white points 304 are stored in a predetermined area of the RAM 106.

Note that the local adapting visual field size indicates a local adapting visual field as a region where local adaptation occurs, and the local white point is a color that one recognizes as white in the local adapting visual field. As will be described in detail later, the CPU 104 calculates white points and luminance values (adapting white points and adapting luminance values 305) indicating states of adaptation using the white point 303 of the light source and the local white points 304, and stores them in a predetermined area of the RAM 106 (S204). The CPU 104 executes image correction (correction for adaptation) based on a human vision model using the adapting white points and adapting luminance values 305 to generate image data 306 after correction (S205). Note that the adapting white points and adapting luminance values are data indicating states of local adaptation of the vision at the time of photographing of the image data 301 before correction.

Calculation of Local White Point (S203)

Figure 7:
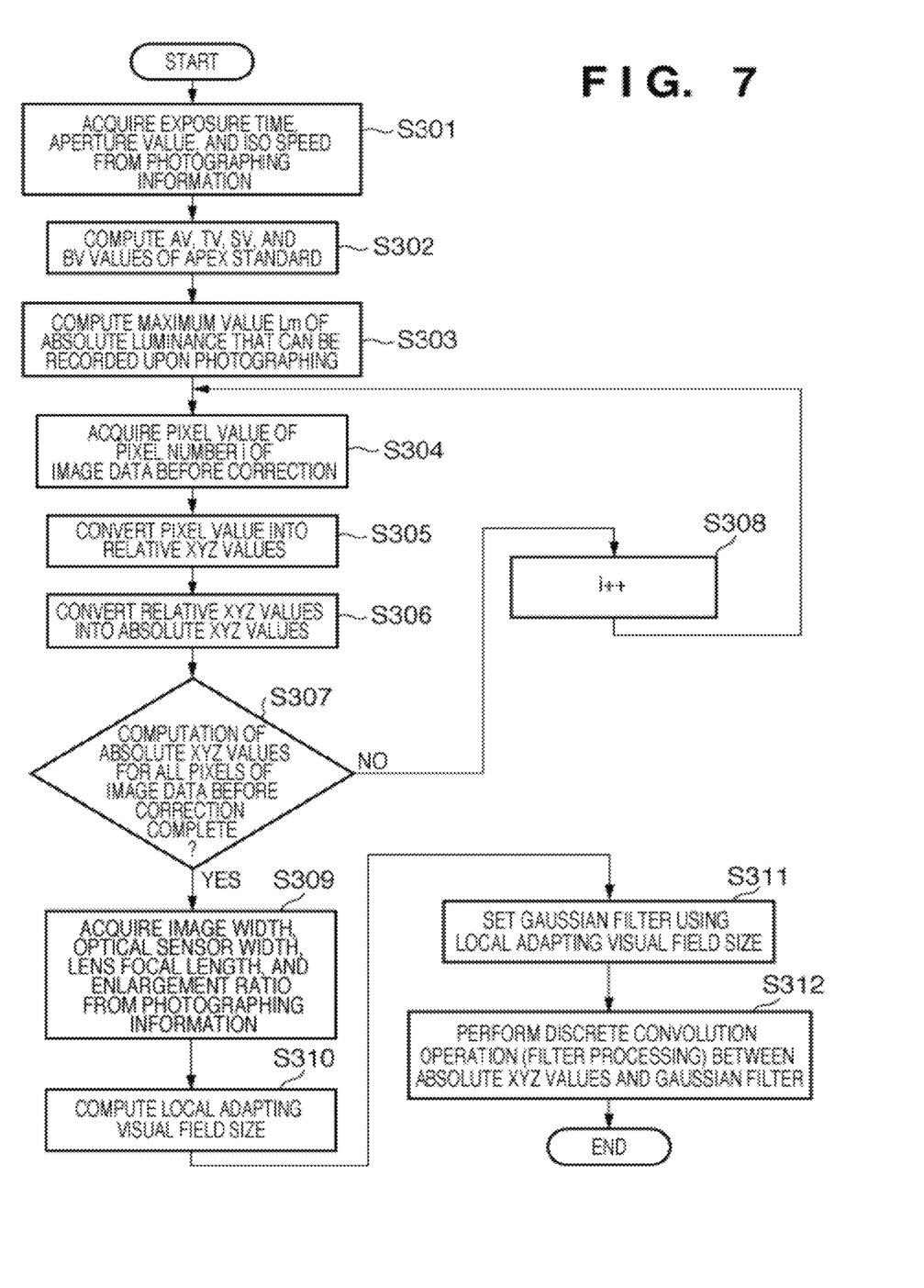
FIG. 7 is a flowchart for explaining calculations of a local white point.

FIG. 7 is a flowchart for explaining the calculations of the local white point (S203).

The CPU 104 acquires an exposure time T, aperture value F, and ISO speed from the photographing information 302 (S301), and computes an AV value, TV value, SV value, and BV value of the APEX standard (S302) by:

AV(aperture value)=$2 \cdot \log_2(F)$

TV(shutter speed value)=$-\log_2(T)$

SV(film speed value)=$\log_2(ISO/3.0)$ (1)

BV(brightness value)=AV+TV−SV (2)

The CPU 104 computes a maximum value Lm [cd/m²] of an absolute luminance that can be recorded upon photographing using the BV value (S303) by:

$$Lm = 3.3 \times 2^{BV}/18.0 \times 201.0 \quad (2)$$

The CPU 104 acquires a pixel value (RGB values) of a pixel number i (pixel of interest) of the image data 301 before correction (S304), and converts the acquired pixel value into relative XYZ values $XYZ_{rlt}$ (S305), for example, by:

$$\begin{bmatrix} X_{rlt} \\ Y_{rlt} \\ Z_{rlt} \end{bmatrix} = \begin{bmatrix} 0.41 & 0.36 & 0.18 \\ 0.21 & 0.71 & 0.07 \\ 0.02 & 0.12 & 0.95 \end{bmatrix} \begin{bmatrix} R \\ G \\ B \end{bmatrix} \quad (3)$$

Note that the initial value of the pixel number i is "1".

The CPU 104 converts the relative XYZ values $XYZ_{rlt}$ into absolute XYZ values $XYZ_{abs}$ using the maximum value Lm of the absolute luminance that can be recorded upon photographing by:

$$\begin{bmatrix} X_{abs} \\ Y_{abs} \\ Z_{abs} \end{bmatrix} = [Lm/255] \begin{bmatrix} X_{rlt} \\ Y_{rlt} \\ Z_{rlt} \end{bmatrix} \quad (4)$$

Note that a constant "255" is a value used to normalize a luminance value when each channel of RGB values is an 8-bit unsigned integer. Therefore, this constant is changed appropriately according to the definition (bit width) of RGB data.

The CPU 104 stores the absolute XYZ values $XYZ_{abs}$ in a predetermined area of the RAM 106 (S306).

The CPU 104 determines if the absolute XYZ values have been calculated for all pixels of the image data 301 before correction (S307). If pixels to be processed still remain, the CPU 104 increments the pixel number i by 1 (S308), and the process returns to step S304. If the computation of the absolute XYZ values for all the pixels of the image data 301 before correction is complete, the process advances to step S309.

The CPU 104 acquires an image width W, optical sensor width dw, lens focal length f, and enlargement ratio m from the photographing information 302 (S309), and computes a local adapting visual field size S using a predetermined viewing angle θ of adapting visual field (S310) by:

$$S = \tan(\theta/2)/\{dw/2f(1+m)\} \times W \quad (5)$$

Figure 8:
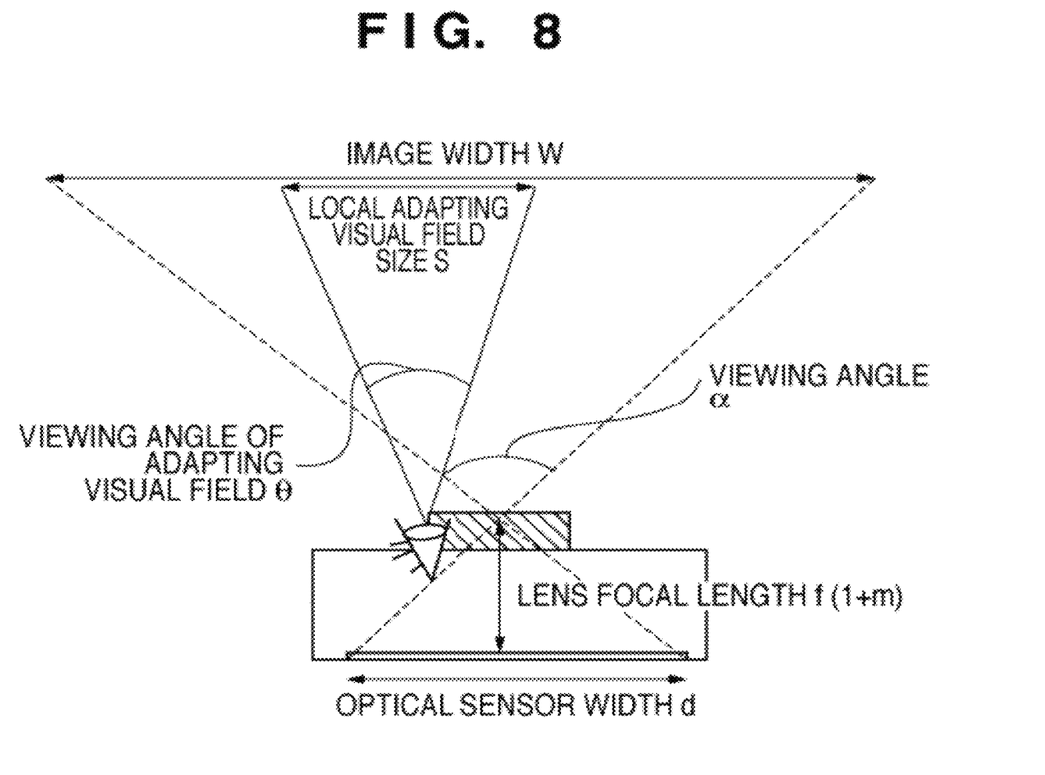
FIG. 8 is a view for explaining the relationship among an image width W, optical sensor width dw, lens focal length f, enlargement ratio m, viewing angle θ of adapting visual field, and adapting visual field size S.

Note that FIG. 8 is a view for explaining the relationship among the image width W, optical sensor width dw, lens focal length f, enlargement ratio m, viewing angle θ of adapting visual field, and local adapting visual field size S.

Note that an image height H and optical sensor height dh may be used in place of the image width W and optical sensor width dw.

The CPU 104 then sets a Gaussian filter using the local adapting visual field size S (S311) by:

$$\text{Filter}(a,b) = 1/k \cdot \exp\{-(a^2+b^2)/2(S/2)^2\} \quad (6)$$

$$\text{for } k = \Sigma_{-S}^{+S} \Sigma_{-S}^{+S} \exp\{-(a^2+b^2)/2(S/2)^2\}$$

where (a, b) represents relative coordinates from a pixel at the filter center.

Note that this embodiment gives ½ of the local adapting visual field size S as a variance of the Gaussian filter to set a filter according to the local adapting visual field size S. The filter processing range is −S to +S including about 95% of integral values of the Gaussian function.

The CPU 104 performs a discrete convolution operation of the absolute XYZ values calculated in step S306 and the Gaussian filter set in step S311, which operation is given by:

$$\text{Img}'(x,y) = \Sigma_{-S}^{+S} \Sigma_{-S}^{+S} \text{Img}(x-a, y-b) \text{Filter}(a,b) \quad (7)$$

where (x, y) is a pixel position which is to undergo the filter processing, $x = 0, \ldots, W-1,$ $y = 0, \ldots, H-1,$ Img(x, y) indicates the absolute XYZ values at a pixel position (x, y) of the image data 301 before correction, and Img'(x, y) indicates the absolute XYZ values at the pixel position (x, y) after the convolution operation.

The CPU 104 stores absolute XYZ values (local white points 304) as a result of the discrete convolution operation in a predetermined area of the RAM 106 (S312).

Figure 9A:
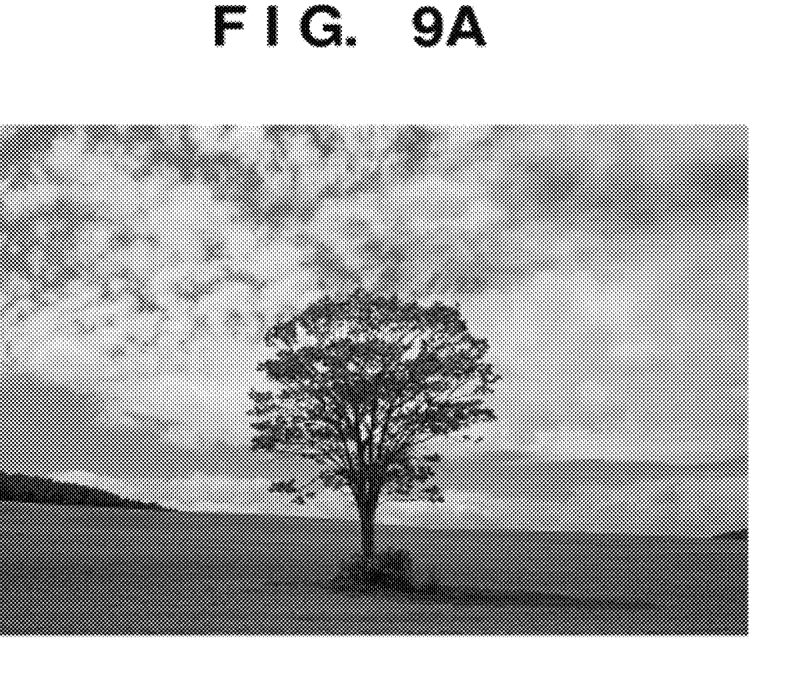
FIGS. 9A and 9B are views showing local white points.
Figure 9B:
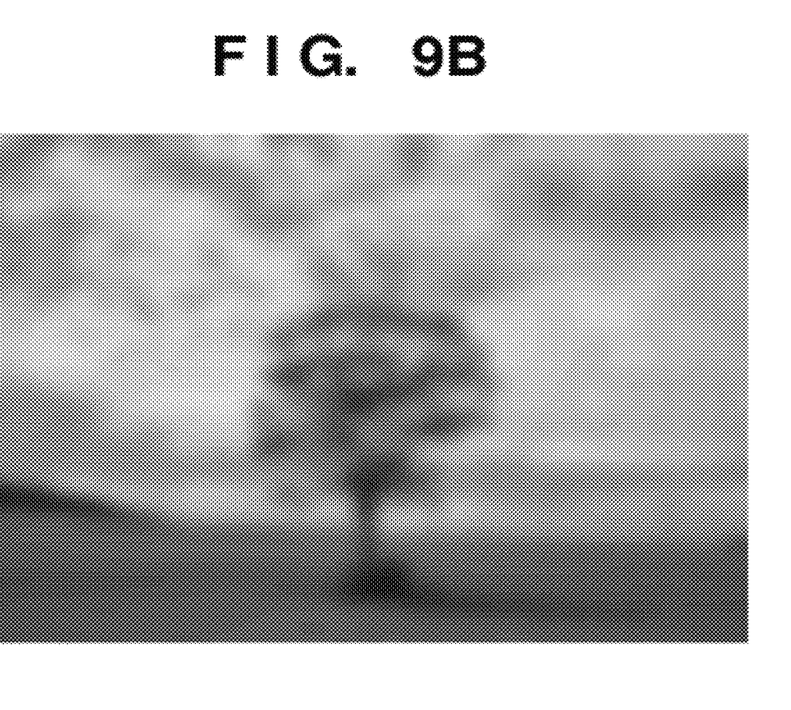

The local white points 304 are XYZ values, which are obtained by the above processing, that is, by applying Gaussian filter processing to the absolute XYZ values of all the pixels. FIGS. 9A and 9B show the local white points 304. FIG. 9A shows a photographed image corresponding to the image data 301 before correction, and FIG. 9B shows an image indicating the local white points 304 obtained by blurring the photographed image.

Calculations of Adapting White Points and Adapting Luminance Values 305 (S204)

Figure 10:
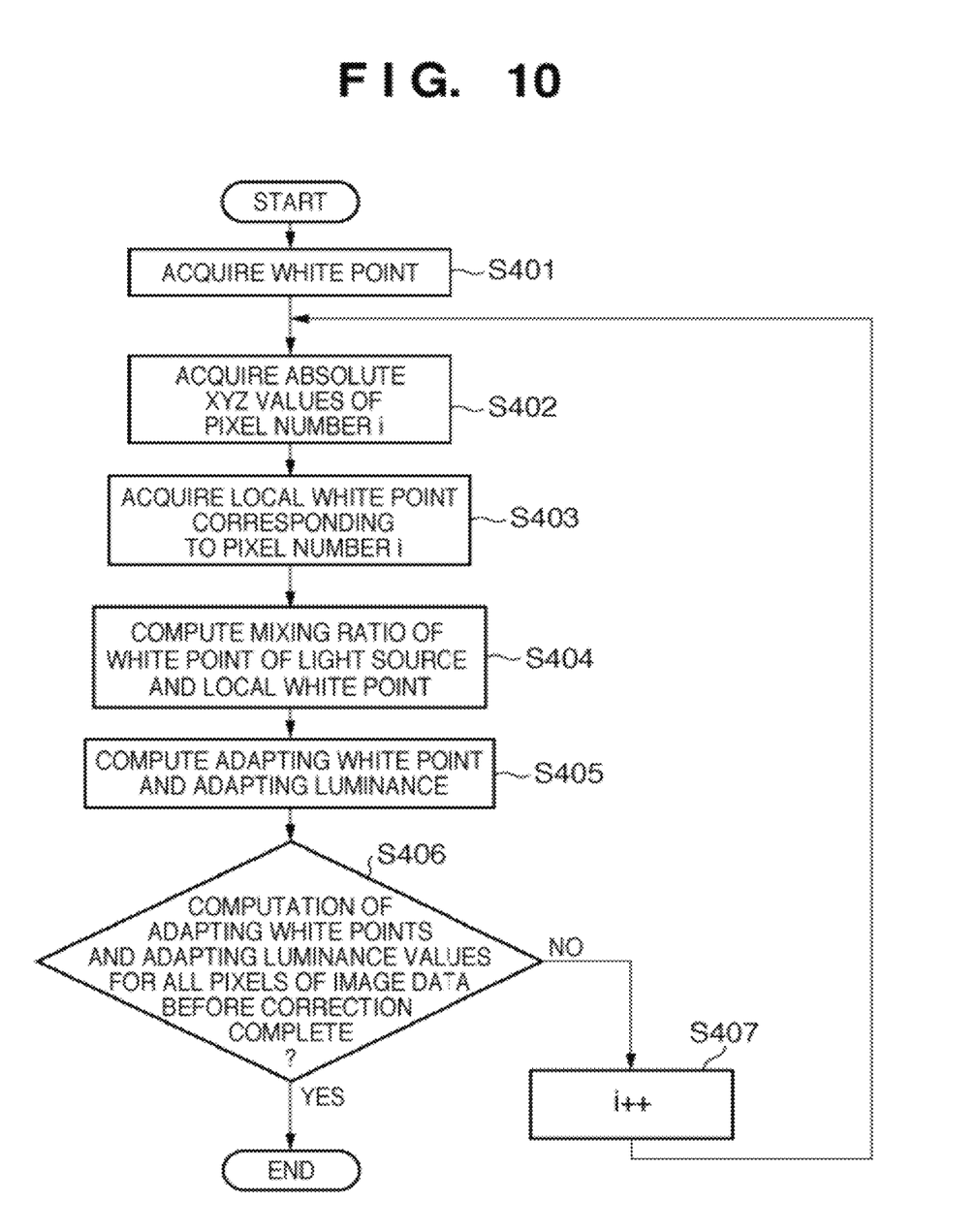
FIG. 10 is a flowchart for explaining calculations of an adapting white point and adapting luminance.

FIG. 10 is a flowchart for explaining the calculations of the adapting white points and adapting luminance values 305 (S204).

The CPU 104 acquires the white point 303 from the RAM 106 (S401), acquires absolute XYZ values of a pixel number i (pixel of interest) (S402), and acquires the local white point 304 corresponding to the pixel number i (S403). Note that the initial value of the pixel number i is "1".

The CPU 104 computes a mixing ratio M of the white point of the light source and the local white point using a luminance value $Y_w$ of the white point 303 and a luminance value $Y_{wL}$ of the local white point 304 corresponding to the pixel number i (S404) by:

$$M = Y_w/(Y_w + Y_{wL}) \quad (8)$$

The CPU 104 computes an adapting white point $XYZ_{Aw}$ and adapting luminance value $Y_A$ using XYZ values $XYZ_w$ of the white point 303, XYZ value $XYZ_{wL}$ of the local white point 304, and the mixing ratio M by:

$$\begin{bmatrix} X_{AW} \\ Y_{AW} \\ Z_{AW} \end{bmatrix} = M \begin{bmatrix} X_w \\ Y_w \\ Z_w \end{bmatrix} + (1-M) \begin{bmatrix} Z_{wL} \\ Y_{wL} \\ Z_{wL} \end{bmatrix} \quad (9)$$

$$Y_A = 0.2 \times Y_{AW} \quad (10)$$

The CPU 104 stores the adapting white point $XYZ_{Aw}$ and adapting luminance value $Y_A$ in a predetermined area of the RAM 106 in correspondence with the pixel number i (S405).

The CPU 104 determines if the adapting white points and adapting luminance values 305 are calculated for all pixels of the image data 301 before correction (S406). If pixels to be processed still remain, the CPU 104 increments the pixel number i by 1 (S407), and the process returns to step S402. If the computation of the adapting white points and adapting luminance values 305 for all the pixels of the image data 301 before correction is complete, the CPU 104 ends the processing.

Image Correction (S205)

Figure 11:
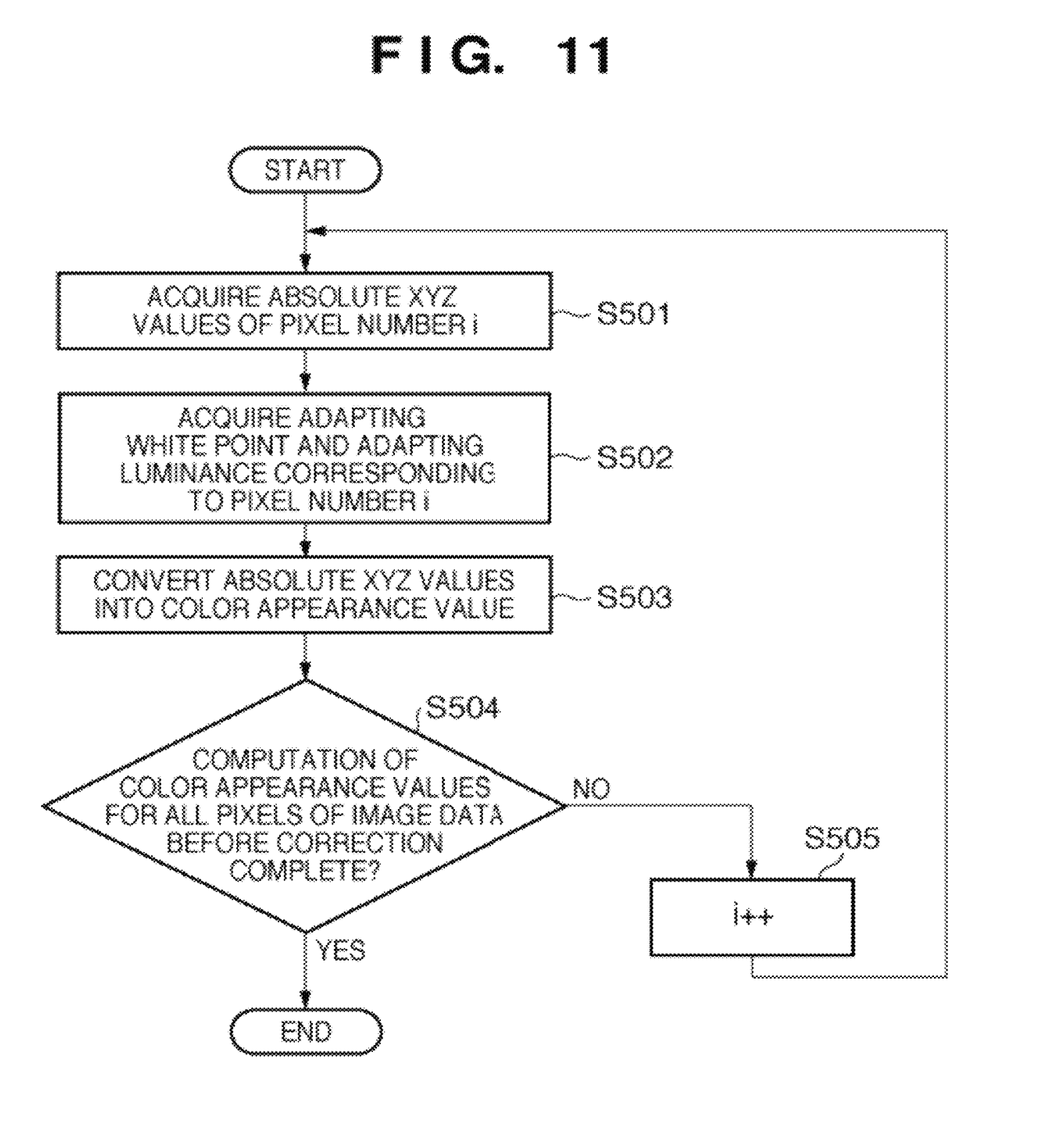
FIG. 11 is flowchart for explaining image correction.

FIG. 11 is a flowchart for explaining the image correction (S205).

The CPU 104 acquires the absolute XYZ values of a pixel number i (S501), and acquires the adapting white point and adapting luminance value 305 corresponding to the pixel number i (S502).

The CPU 104 converts the absolute XYZ values of the pixel number i into a color appearance value using the adapting white point and adapting luminance value 305 (S503). In this embodiment, the CPU 104 converts the absolute XYZ values into a color appearance value using the iCAM06 and stores the color appearance value as a pixel value of the image data 306 after correction in, for example, the data storage unit 102.

The iCAM06 expresses a color appearance value using three different parameters I, P, and T. I is a parameter that represents lightness perceived by a human, and P and T are parameters that represent a color perceived by a human. The iCAM06 extracts low-frequency components by applying filter processing to absolute XYZ values converted from image data, and extracts high-frequency components from differences between the low-frequency components of the absolute XYZ values and the original absolute XYZ values. Then, the iCAM06 compresses the extracted low-frequency components as local adaptation processing using data indicating the lightness levels and colors of an actual scene that one perceives (data indicating the states of adaptation). After that, the iCAM06 composites the compressed low-frequency components and extracted high-frequency components to convert them into a color appearance value.

The CPU 104 determines if the calculations of color appearance values for all pixels of the image data 301 before correction are complete (S504). If pixels to be processed still remain, the CPU 104 increments the pixel number i by 1 (step S505), and the process returns to step S501. If the calculations of color appearance values for all pixels of the image data 301 before correction is complete, the CPU 104 ends the processing.

In this embodiment, the adapting white points and adapting luminance values upon viewing an actual scene can be accurately calculated using equations (9) and (10) which consider both the white point 303 of the light source at the time of photographing and the local white points 304, and the appearance of the scene can be simulated with high accuracy. In other words, color appearance values can be calculated with high accuracy.

In this manner, the states of adaptation of the vision at the time of photographing of image data are calculated using the white point of the light source at the time of photographing (or white balance information) and the local white points calculated from the image data. Therefore, the states of adaptation of the vision at the time of photographing of image data can be computed more accurately while preventing excessive reflection of the locality of adaptation caused when low-pass filter processing is applied to image data. In other words, how one views an actual scene can be accurately simulated in a human vision model that takes local adaptation into consideration. As a result, an HDR image can be preferably reproduced by the HDR reproduction technique using a human vision model such as the iCAM or iCAM06 that takes local adaptation into consideration, and an image output device such as a monitor or printer.

Modification of Embodiment

Image Data File

In the above description, the format shown in FIG. 6 is explained as that of the image data file. However, the type of data and the format are not limited to the format shown in FIG. 6 as long as at least one of data associated with an image and that associated with photographing is recorded. For example, image data may be 16-bit RGB data, or the absolute XYZ values of respective pixels may be computed and recorded in advance. Alternatively, in place of the optical sensor width, lens focal length, and enlargement ratio, a viewing angle at the time of photographing may be computed and recorded in advance. Likewise, in place of the exposure time, aperture value, and ISO speed, the maximum value of an absolute luminance in a scene measured by, for example, a luminance meter may be recorded. Furthermore, the format of the image data file may be, for example, the Exif format, and data associated with an image and that associated with photographing may be recorded in association with different files.

Setting Method of Viewing Angle of Adapting Visual Field

Figure 12:
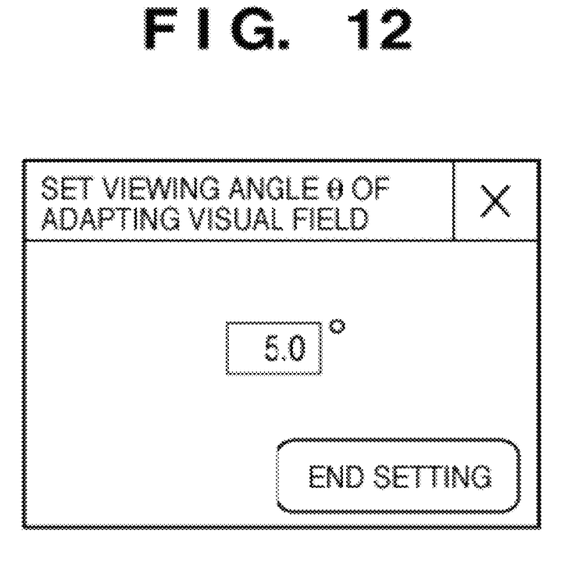
FIG. 12 is a view showing a UI used to set a viewing angle of adapting visual field.

In the example of the above description, the predetermined viewing angle θ of adapting visual field recorded in, for example, the data storage unit 102 is used. Alternatively, the viewing angle θ of adapting visual field may be arbitrarily set. FIG. 12 is a view showing a UI used to set the viewing angle θ of adapting visual field, and the CPU 104 displays this UI on the display unit 103. The user can set an arbitrary viewing angle θ of adapting visual field using this UI and the input unit 101.

Calculation Method of Local Adapting Visual Field Size

In the example of the above description, the local adapting visual field size S is calculated by equation (5) using the viewing angle θ of local adapting visual field, image width W, optical sensor width dw, lens focal length f, and enlargement ratio m. However, the type of method is not particularly limited as long as it calculates the local adapting visual field size S using the photographing information 302. For example, the local adapting visual field size S may be calculated using a viewing angle α as the photographing information 302, as described by:

$$S=\tan(\theta/2)/\tan(\alpha/2)\times W \quad (11)$$

Calculation Method of Relative XYZ Values

In the example of the above description, the RGB values of each pixel are converted into relative XYZ values using equation (3). However, the conversion method is not particularly limited as long as it converts image data into XYZ values. For example, when RGB values are converted into XYZ values, different values of matrix coefficients may be used in terms of, for example, computation accuracy.

Calculation Method of Absolute XYZ Values

In the example of the above description, the values of the APEX standard are calculated from the photographing information 302, the maximum value Lm of the absolute luminance that can be recorded upon photographing is calculated, and relative XYZ values are converted into absolute XYZ values using equation (4). However, the conversion method is not particularly limited as long as it converts image data into absolute XYZ values. For example, the maximum value of the absolute luminance that can be recorded upon photographing may be calculated by the aforementioned method in advance, and may be recorded in the photographing information 302.

Calculation Method of Local White Point

In the example of the above description, Gaussian filter processing is applied to the absolute XYZ values as the method of calculating the local white points 304. However, the type of filter processing is not particularly limited as long as low-pass filter processing is applied to image data (a pixel of interest and its surrounding pixels) to extract low-frequency components of the image data (for example, a bilateral filter). For example, the local white points 304 may be calculated by applying simple average filter processing to image data, as described by:

$$Img'(x,y)=1/(4S^2)\cdot \Sigma_{-S}^{+S}\Sigma_{-S}^{+S}Img(x+a,y+b) \quad (12)$$

where (x, y) is a pixel position which is to undergo the filter processing, $$x=0,\ldots,W-1,$$

$$y=0,\ldots,H-1,$$

Img(x, y) indicates the absolute XYZ values at a pixel position (x, y) of the image data 301 before correction, and Img'(x, y) indicates the absolute XYZ values at the pixel position (x, y) after the filter processing.

As a filter size used upon calculating the local white points 304, the local adapting visual field size S calculated from the photographing information 302 is used. Alternatively, an arbitrary filter size may be set. For example, a UI used to set a filter size, which is similar to that shown in FIG. 12, may be prepared, and the CPU 104 displays this UI on the display unit 103 to allow the user to set the filter size.

Calculation Method of State of Adaptation

In the example of the above description, as the method of calculating data indicating the state of adaptation, the mixing ratio M of the white point of the light source and the local white points is calculated using equation (8), and the adapting white point and adapting luminance value 305 are calculated using equations (9) and (10). However, the calculation method is not limited to this method as long as a method calculates data indicating the state of adaptation using the white point of the light source and the local white points. For example, in equation (8) above, the mixing ratio M is decided based on the ratio of Y values. Alternatively, the mixing ratio M may be decided based on a luminance difference from an absolute luminance $Y_{abs}$ of the pixel number i by:

$$M=|(Y_w-Y_{abs})/(Y_{wL}+Y_w-2Y_{abs})| \quad (13)$$

The mixing ratio M in this case is a parameter which changes according to the pixel number.

Figure 13:
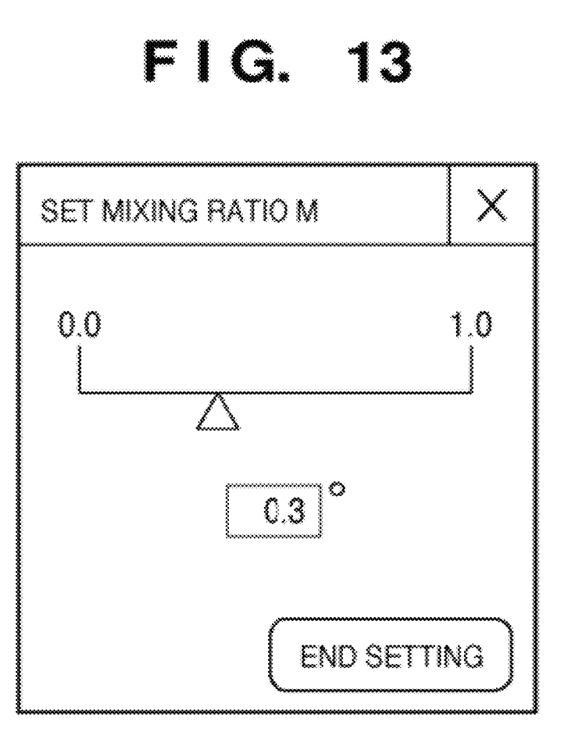
FIG. 13 is a view showing a UI used to set a mixing ratio.

Alternatively, the mixing ratio M may be arbitrarily set. FIG. 13 is a view showing a UI used to set the mixing ratio M, and the CPU 104 displays this UI on the display unit 103. The user can set an arbitrary mixing ratio M using this UI and the input unit 101.

Image Processing

In the above description, the processing until color appearance values indicating the appearance of a scene are calculated using the iCAM06 has been explained. Image processing to be applied to the calculated color appearance values are not particularly limited. For example, a processing unit which converts the color appearance values (data indicating appearance of a scene in the iCAM06) into signal values of an image output device may convert the color appearance values into RGB values or CMYK values of the image output device, and image data as the conversion result may be output to the image output device.

In the case of the above description, image data photographed by a digital camera is corrected. However, the present invention is also applicable to a case in which an image according to a device is to be corrected (e.g., image data displayed on a display device is to be corrected). Note that when image data displayed on a display device is to be corrected, a white point of the display device is preferably used as a white point of a display condition.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-223920, filed Sep. 1, 2008, which is hereby incorporated by reference herein in its entirety.

What is claimed is:

1. An image processing apparatus comprising:
an acquisition section, configured to acquire a white point of a shooting condition corresponding to image data;
a first calculator, configured to calculate information of a local white point corresponding to a pixel of interest of the image data using surrounding pixels of the pixel of interest;
a second calculator, configured to calculate an adapting white point corresponding to the pixel of interest based on the white point of the shooting condition and the information of the local white point; and
a corrector, configured to correct image data of the pixel of interest using the adapting white point.

2. The apparatus according to claim 1, wherein said second calculator further calculates an adapting luminance value corresponding to the pixel of interest from the white point of the shooting condition and the information of the local white point.

3. The apparatus according to claim 1, wherein the white point of the shooting condition is a white point associated with ambient light of the image data.

4. The apparatus according to claim 1, wherein said first calculator comprises:
a first computing section, configured to calculate a local adapting visual field size based on photographing information of the image data and a predetermined viewing angle of adapting visual field; and
a second computing section, configured to calculate the information of the local white point by applying low-pass filter processing to image data of the pixel of interest and image data of the surrounding pixels of the pixel of interest based on the local adapting visual field size.

5. The apparatus according to claim 1, wherein said second calculator comprises:
a second computing section, configured to calculate a mixing ratio of a luminance value of the white point of the shooting condition and a luminance value of the information of the local white point; and
a second computing section, configured to calculate the adapting white point corresponding to the pixel of interest from the white point of the shooting condition and the information of the local white point using the mixing ratio.

6. The apparatus according to claim 5, wherein said second computing section calculates the mixing ratio as a ratio or a difference between the luminance value of the white point of the shooting condition and the luminance value of the information of the local white point.

7. An image processing method which is carried out in an image processing apparatus, the method comprising the steps of:
- acquiring a white point of a shooting condition corresponding to image data;
- calculating information of a local white point corresponding to a pixel of interest of the image data using surrounding pixels of the pixel of interest;
- calculating an adapting white point corresponding to the pixel of interest based on the white point of the shooting condition and the information of the local white point; and
- correcting image data of the pixel of interest using the adapting white point.

8. A non-transitory computer-readable medium storing a computer-executable program for causing a computer to perform an image processing method, the method comprising the steps of:
- acquiring a white point of a shooting condition corresponding to image data;
- calculating information of a local white point corresponding to a pixel of interest of the image data using surrounding pixels of the pixel of interest;
- calculating an adapting white point corresponding to the pixel of interest based on the white point of the shooting condition and the information of the local white point; and
- correcting image data of the pixel of interest using the adapting white point.

* * * * *